United States Patent [19]

Camras

[11] Patent Number: 4,628,374
[45] Date of Patent: Dec. 9, 1986

[54] MAGNETIC RECORDING SYSTEM AND METHOD

[75] Inventor: Marvin Camras, Glencoe, Ill.

[73] Assignee: IIT Research Institute, Chicago, Ill.

[21] Appl. No.: 760,254

[22] Filed: Jul. 29, 1985

Related U.S. Application Data

[63] Continuation-in-part of Ser. No. 621,490, Jun. 18, 1984, abandoned, which is a continuation-in-part of Ser. No. 293,838, Aug. 18, 1981, Pat. No. 4,455,581.

[51] Int. Cl.⁴ .......................... G11B 5/03; G11B 5/127
[52] U.S. Cl. ........................................ 360/66; 360/118
[58] Field of Search ................. 360/118, 119, 123, 66

[56] References Cited

U.S. PATENT DOCUMENTS 2,900,443  8/1959  Camras ................................. 178/6.6
3,686,467  8/1972  Camras ................................. 360/119

*Primary Examiner*—Vincent P. Canney
*Attorney, Agent, or Firm*—Hill, Van Santen, Steadman & Simpson

[57] ABSTRACT

Magnetic recording circuitry supplies to the recording head in addition to the signal to be recorded a train of constant amplitude pulses of extremely short duration and of low duty cycle; for example, pedestal pulses of polarity corresponding to the signal are superimposed on the signal for higher positive and negative signal amplitudes, while alternating polarity pulses are supplied during periods of low signal amplitude, such that the transducer system exhibits a substantially linear transfer function.

21 Claims, 27 Drawing Figures

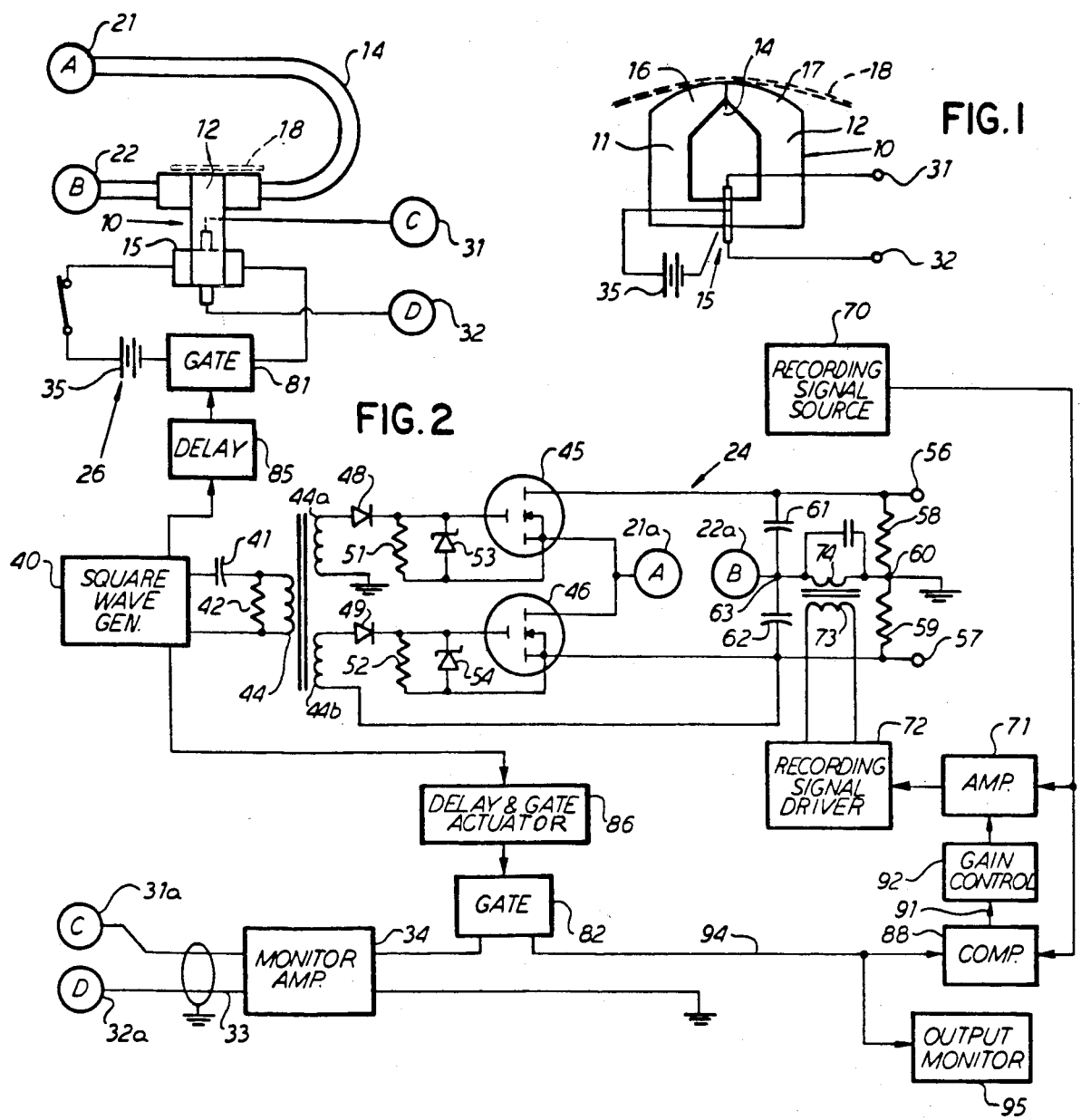
FIG. 1
FIG. 2
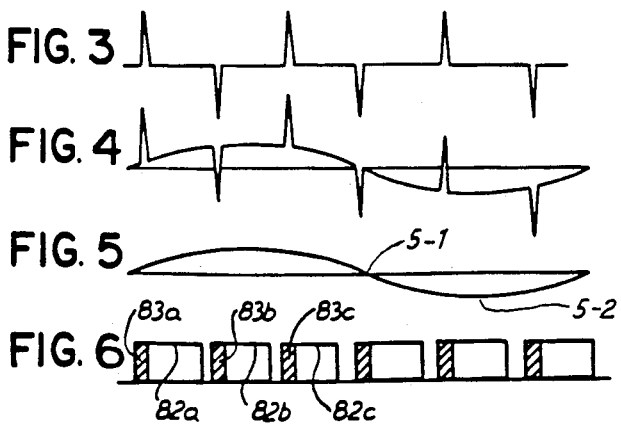
FIG. 3
FIG. 4
FIG. 5
FIG. 6
FIG. 7
FIG. 8

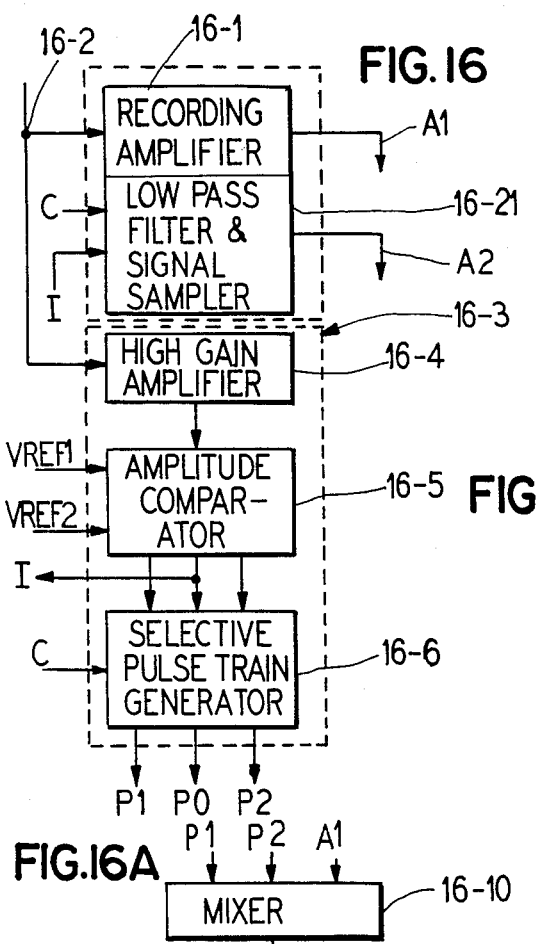
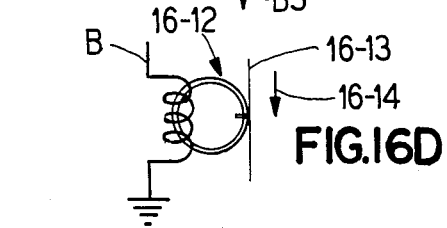
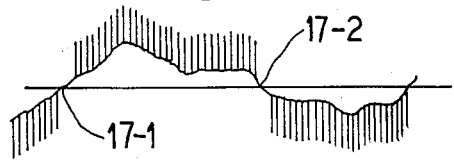
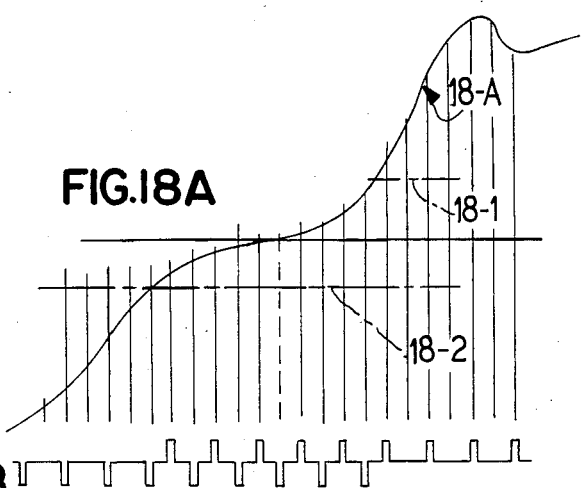
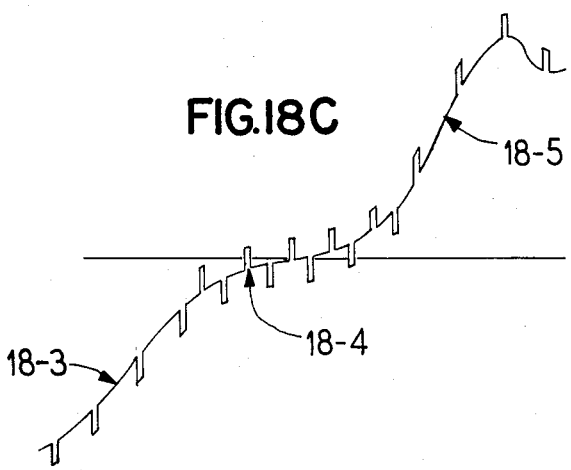
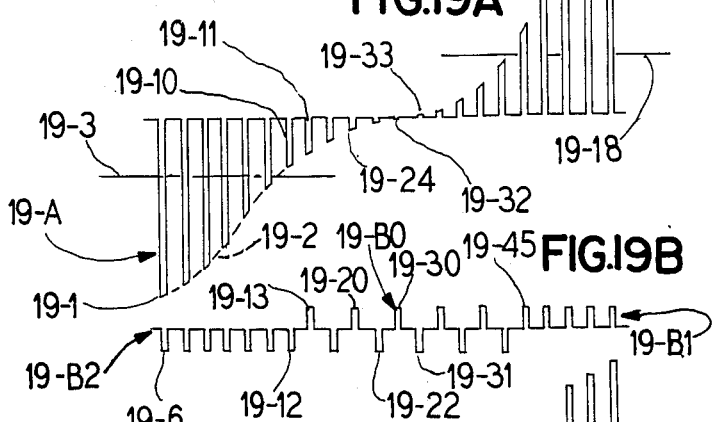
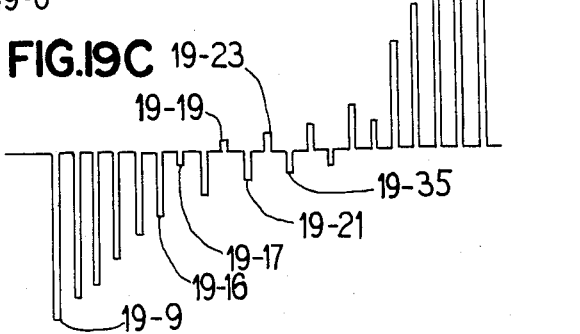

MAGNETIC RECORDING SYSTEM AND METHOD

CROSS-REFERENCE TO RELATED APPLICATIONS

The present application is a continuation in part of my copending application U.S. Ser. No. 621,490 filed June 18, 1984, (now abandoned), which in turn is a continuation in part of my copending application U.S. Ser. No. 293,838 filed Aug. 18, 1981, now U.S. Pat. No. 4,455,581 issued June 19, 1984.

BACKGROUND OF THE INVENTION

In the magnetic recording field, there has been a continuing development effort toward producing magnetic transducer heads of higher and higher resolution. As the effective length measured across the transducing gap of the head is reduced, with a consequent reduction in gap reluctance, higher input signals to the head are generally required to produce a given level of recorded magnetization. The requirement for the use of a superimposed high frequency bias signal can result in undue heating of the head, particularly as the coercivity of the record medium is increased for the sake of higher resolution. The undue heating is a problem in recording heads as well as erasing heads, not only because of possible damage to the record medium, but also because the record medium coating material may be softened and accumulate on the head if the head is operated at relatively high temperatures and slow scanning speeds. Also the magnetic properties of the head core and of the record medium may be adversely affected.

While magnetic records can be monitored shortly after being made, such monitoring has typically been for the purpose of verifying that fact of a recording being made without the availability of immediate correction of the record in the event of an inaccuracy in the recorded signal.

SUMMARY OF THE INVENTION

Accordingly, it is an object of the present invention to mitigate the foregoing problems and to provide a transducer head of higher resolution capability and a head capable of more accurate recording or erasing while avoiding the problem of high operating temperature.

In accordance with one aspect of the invention, a transducer head configuration is utilized which is operable by means of recording pulses of extremely short duration and of low duty cycle; further, provision may be made for reading the recorded magnetization on the record medium between recording pulses and correcting the recorded magnetization is necessary in a subsequent recording pulse prior to substantial movement of the record medium relative to the transducing gap.

By the use of such recording pulses in such a way as to provide a required recording bias in conjunction with the signal to be recorded, or a required erasing field, much less energy is needed and the head is able to operate at a much lower temperature, thus also reducing any danger of harming the tape or of gathering tape coating material at record medium contacting surfaces of the head. A turn-in-gap spacer can be made of thinner material having higher resistance without excessive heating. With audio frequency recordings the duty cycle can be made exceptionally small while assuring the fidelity of the recorded magnetization. For example, the interval between pulses can be about twelve microseconds and the pulse width can be in a range from about twelve nanoseconds to four nanoseconds for a duty cycle of 0.001 to 0.00033, or even shorter. Where desired, the short duration of the pulses allows modification of the field at the gap before the record medium has moved appreciably. Pulse bias or pulse erasing is especially effective with thin film gap spacers (e.g. used as head windings) since angstrom magnitude film thicknesses have high resistance and prohibitive losses when used in a conventional manner.

The fine particle (or thin film) structure of the record tape magnetizable layer provides response to nanosecond pulses. Such pulse type magnetic fields are sufficient to set the magnetic domains of the recording layer of the record medium. It is not necessary to maintain the magnetic field once the domains are set, so there is a great savings in turning off the applied magnetic field between the pulses. Further the off interval may be used to advantage (e.g. for monitoring or linearization of the recording). To read the recorded magnetization in such off intervals, a flux sensitive pickup such as a Hall element can be utilized although transducers based on magnetoresistance or magnetic modulator effects can also be used. Feeding back the playback signal through a comparator with a slight delay or memory to modify the subsequent recording pulse (when the initial magnetization deviates from the input signal) allows recordings to be made on the record medium which are corrected for variations in tape-head contact, dropout effects, biasless recording, etc.

For successful alternating polarity pulse bias, a discontinuous pulse waveform is used with relatively short duration pulses of alternate polarity and with substantially zero amplitude intervals of relatively long duration between the successive pulses of alternate polarity.

Pedestal type pulses of constant amplitude and of polarity corresponding to the instantaneous polarity of the signal information waveform may be superimposed on the signal during recording, and such pedestal pulses may be interrupted when the signal has negligible amplitude, e.g. during polarity transitions of the signal waveform. Alternatively during polarity transitions of the signal waveform, the single polarity pedestal pulses may be replaced by alternating polarity low duty cycle pulses which insure linear recording of low amplitude signals and a zero magnetization of the record medium for a zero signal amplitude. The pulse repetition rate of the constant amplitude pulses preferably corresponds to a fundamental frequency which is more than twice the maximum frequency which can be recorded by the magnetic transducer head.

In Camras U.S. Pat. No. 2,900,443, the teaching in one embodiment was to record video signal information in the form of successive pulses where the amplitude of each pulse represented the amplitude of a sample of the analog signal. Where precise linearity was desired, a high frequency bias field was to be superimposed, e.g. by means of an auxiliary bias head. Thus, the early Camras patent directs the art away from the present invention and toward the actual recording on a record medium of individual pulses which constitute the signal information. The teachings of the present invention of applying pulses to the recording head at a repetition rate at least twice the head resolution is totally contrary to the teaching of the early Camras patent!

BRIEF DESCRIPTION OF THE DRAWINGS

FIG. 1 is a somewhat diagrammatic side elevational view of a magnetic transducer system in accordance with the present invention;

FIG. 2 is a somewhat diagrammatic end view of the transducer head of FIG. 1 and shows an exemplary electric circuit diagram for operating the transducer head in accordance with the system and method of the present invention;

FIG. 3 illustrates a pulse waveform as generated by the circuitry of FIG. 2;

FIG. 4 shows a resultant waveform as supplied to the transducer head of FIGS. 1 and 2 during recording mode;

FIG. 5 illustrates a signal waveform which has been superimposed on the pulse signal of FIG. 3 to provide the resultant waveform of FIG. 4;

FIG. 6 is a diagram for illustrating the operation of the gating circuits of FIG. 2;

FIG. 7 shows a different pulse waveform which may be utilized in place of the waveform of FIG. 3 in carrying out the system and method of the present invention;

FIG. 8 shows a further waveform which may be utilized in place of the waveform of FIG. 4 in carrying out the system and method of the present invention;

FIG. 16 is a block diagram for illustrating several different modes of recording operation in accordance with the present invention;

FIGS. 16A, 16B and 16C illustrate mixer circuits for receiving indicated output signals from the circuit of FIG. 16, and for supplying a resultant signal representing a superimposition of the input signals;

FIG. 16D shows a magnetic transducer system for recording any one of the resultant signals supplied by FIG. 16A, 16B or 16C;

FIG. 17 shows one form of resultant waveform as supplied by FIGS. 16 and 16A;

FIG. 18A illustrates a signal waveform which may be supplied to an input A1 of the mixer of FIG. 16B by the circuit of FIG. 16;

FIG. 18B shows a composite of the pedestal pulse trains supplied from the three outputs P1, P0 and P2 of FIG. 16 in response to a signal input waveform corresponding to that shown in FIG. 18A;

FIG. 18C shows the resultant waveform produced by the mixer of FIG. 16B in response to inputs as shown in FIGS. 18A and 18B;

FIG. 19A shows a pulse amplitude modulation signal generally corresponding to the signal waveform of FIG. 18A, but which is supplied to input A2 of FIG. 16C;

FIG. 19B corresponds with FIG. 18B, but shows the pulse train sequence at it is supplied to inputs P1, P0 and P2 of FIG. 16C; and FIG. 19C shows the resultant waveform supplied by the mixer of FIG. 16C.

DETAILED DESCRIPTION

Figure 9:
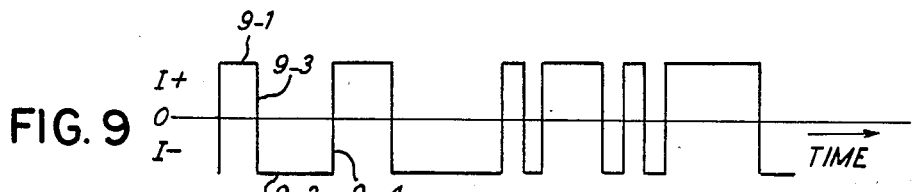
FIG. 9 shows a conventional NRZ (non-return to zero) recording waveform.

FIG. 1 is a side view of a transducer head useful in carrying out the recording and playback operations of the present invention. The transducer head comprises a ring type core 10 with a pair of core pieces 11 and 12 separated by a gap conductor element 14 in the transducing region of the core, and separated by a Hall element assembly 15 at a gap region remote from the transducing region. A tape record medium travels successively over the pole pieces 16 and 17 of the transducer head along a tape path indicated at 18.

FIG. 2 is an end view of the head assembly 10 and shows the gap conductor 14 as having respective terminals 21 and 22 which are connected by means of suitable electrical conductors with terminals 21a and 22a of a driver circuit 24. FIG. 2 also shows an energizing circuit 26 associated with the Hall element 15. In particular, terminals 31 and 32 in FIGS. 1 and 2 are connected with terminals 31a and 32a of a shielded cable 33, leading to a monitor amplifier 34. FIG. 1 may be taken as illustrating the playback of a previously recorded tape whereby a direct current source 35 provides a unidirectional current longitudinally of the Hall element 15 (as viewed in FIG. 2), so that terminals 31 and 32 supply a continuous output analog signal in accordance with the signal flux threading the loop magnetic core 10 and thus traversing the Hall element 15 at the region of the back gap between core pieces 11 and 12.

During recording operation with the system of FIG. 2, a square wave generator 40 has its rectangular waveform output differentiated by means of capacitor 41 and resistor 42 so as to generate opposite polarity pulses as indicated in FIG. 3 at transformer 44. The secondary windings of transformer 44 drive respective power field effect transistors 45 and 46 so as to provide alternating pulse bias at terminals 21a, 22a as in FIG. 3. As indicated respective secondary windings 44a and 44b of transformer 44 are oppositely poled so as to alternately supply pulses of positive polarity via the respective diodes 48 and 49, the gate biasing circuits being completed by respective resistors 51 and 52 which are shunted by respective zener diodes 53 and 54 (built into the transistors). The zener diodes serve to protect the gates of the field effect transistors 45 and 46. A fifty volt power supply is connected to terminals 56 and 57, terminal 56 receiving plus twenty-five volts relative to ground potential and terminal 57 receiving minus twenty-five volts relative to ground potential. Resistors 58 and 59 are connected in series between terminals 56 and 57 to act as a voltage divider for the common power supply and have a common circuit point 60. Capacitors 61 and 62 are also connected across terminals 56 and 57 and have a common circuit point 63 connected with terminal 22a.

A signal to be recorded is supplied from any suitable recording signal source 70 via amplifier 71 and recording signal driver 72 to a transformer 73 having its secondary winding 74 connected between circuit points 60 and 63. In this way, where the recording signal has a waveform as indicated in FIG. 5, a current waveform as indicated in FIG. 4 is actually supplied to the gap conductor 14 via terminals 21a, 22a.

As indicated in FIG. 6, gates 81 and 82 may be placed in open (transmissive) condition during time intervals such as represented at 82a, 82b, 82c, etc. after time delays such as indicated at 83a, 83b, 83c, etc. The time delays are such that a signal once recorded on the record medium at tape path 18 is immediately reproduced by means of Hall element 15 during an interval such as 82a. Delays 85 and 86 are such that the monitor amplifier 34 supplies to comparator 88 only a reproduction of the recorded signal (without any influence from the recording signal field corresponding to the recording current indicated in FIG. 4). Thus, the signal is completely recorded during an interval such as 83a, and playback of the recorded signal at 82a is dependent only on the actually recorded signal. The delay of delay element 86 may be somewhat greater than the delay provided by delay element 85 to eliminate transients resulting from the operation of the Hall element exciter gate 81. The gates 81 and 82 may be six diode switches or other standard types of gating circuits. Delay element 86 may be a monostable multivibrator that holds the gate 82 open during the "playback" interval such as indicated at 82a. Thus the logical one output level from delay element 86 may have a duration corresponding to the time interval 82a of FIG. 6, so as to switch gate 82 to the nonconducting mode before the next pulse of the sequence of FIG. 3 or FIG. 4. Alternatively, delay 86 may comprise a monostable multivibrator which may turn off the gate 82 during intervals such as indicated at 83a, the monostable multivibrator being actuated after an appropriate delay from the previous recording pulse so that it turns off the gate 82 just prior to the recording interval and turns on the gate 82 after the recording interval.

In the comparator 88, the monitored signal magnetization from the record tape during a transmissive interval of gate 82 is compared with the desired signal from recording signal source 70. Any error between the desired and actual recorded signal thus results in an error signal at output 91 of comparator 88. Such error signal may be supplied to a gain control circuit 92 which controls the amplification of amplifier 71 so that during the next recording interval, the recorded magnetization is modified so as to reduce the error signal at output 91 of comparator 88. Thus, the monitored and gated playback signal which is present during interval 82a, FIG. 6, is utilized during recording interval 83b to apply any necessary correction to the signal recorded during previous interval 83a. This is possible because of the high repetition rate of the recording intervals 83a, 83b, in comparison to the time required for the tape to traverse the recording region of the recording head, and in comparison to the highest frequency component of the signal to be recorded.

In order to use the system of FIG. 2 for erasing, recording signal driver 72 may be disconnected from winding 73 so that the waveform of the current applied to the turn-in gap conductor 14 is as represented in FIG. 3. The current pulses of FIG. 3 would be supplied to the conductor 14 at a sufficiently high repetition rate in comparison with tape velocity such that a tape element does not move away from the influence of the head gap in the time between successive magnetic field pulses. Thus, each element on the tape magnetizable layer is subjected to a series of alternately opposite magnetic field pulses of progressively decreasing intensity.

During recording operation, compensation for any residual magnetization of the magnetic core 11, 12 may be effected so that the gated playback signals at conductor 94, FIG. 2, are a function only of the tape magnetization and not of the magnetization of the magnetic core. This may be effected by reading the core magnetization via the Hall element 15 in the absence of a tape at the recording gap of the head 10 and introducing a corresponding compensation in the circuit of the Hall element 15 or at the comparator 88, for example. The effect of core magnetization at the turn-in gap conductor 14 is reduced by the provision of a relatively large additional non-magnetic gap in the magnetic circuit of the core. The Hall element 15, by increasing the dimension of the back gap between core parts 11 and 12, is beneficial in this respect.

Examples of magnetic core configurations which reduce the effect of core magnetization are found in Camras U.S. Pat. No. 3,591,729 issued July 6, 1971.

The waveforms of FIG. 3 and FIG. 7 can be utilized for effecting erasure of a prerecorded magnetic record tape or may be utilized in conjunction with the self correcting recording system as described in conjunction with FIG. 2. Preferably, each of the pulse waveforms has a very low duty cycle, preferably one percent or less with very high frequency components of the pulses or damped waves producing magnetic fields of corresponding waveform. Thus, each of the waveforms of FIG. 3 and FIG. 7 has the advantage of giving higher intensity magnetic fields than can be obtained otherwise without excessive heating, such high field intensities being useful for very high coercivity tapes and/or for thick tape magnetizable layers. Such pulse waveforms use less energy than other methods and the transducer heads can be very small, for example with microdeposited core configurations where heat dissipation and conductor size are otherwise severe problems. The long intervals between pulses or wave trains in relation to the intervals of the pulses or wave trains themselves allows sampling of the recorded magnetization as shown by the circuit diagram of FIG. 2 between recording (or erasing) intervals. Thus feedback type correction acting on subsequent recording impulses as shown in FIG. 2, for example, may be carried out. The higher magnetic fields penetrate deeper into a recording magnetizable layer allowing thicker layers to be used. Eddy currents in the gap spacer are more effective in sharpening the spacial field because of the high pulse train frequency. A quieter erasing or biasing its obtained by the stronger fields and higher frequencies possible with these waveforms. Though the duty cycle is low, the repetition rate is so high that the tape has not moved appreciably between pulses.

FIG. 3 is an example of a suitable waveform where the pulse duration is about twenty nanoseconds, while the time between pulses is two thousand nanoseconds, for example, corresponding to a fundamental frequency of 250 kilohertz. In an audio recorder where twenty kilohertz is the maximum signal frequency, such a signal would have at least 12.5 pairs of pulses as in FIG. 3 to magnetically imprint each cycle of the highest audio frequency. If the tape speed is 3.75 inches per second then the recorded wavelength for the highest audio frequency is 0.0001875 inch. With a head gap of one ten-thousandth inch which is typical, and with the tape moving a distance between pulses of 7.5 microinches, an element of tape is subjected to thirteen pulses while moving across the head gap, confirming that even the shortest wavelengths are imprinted by the pulses with fine gradations. A waveform as in FIG. 3 of magnetic field intensity sufficient to magnetize the tape to saturation may be used to erase the tape if symmetrical as shown. A similar wave of equal or less field intensity but with pulses unsymmetrical, e.g. with positive pulses progressively increasing in amplitude as the alternating negative pulses progressively decrease in intensity and vice versa at the highest frequency to be recorded, faithful recording will be obtained on the tape according to the envelope of dissymmetry. Similarly if a wave such as indicated in FIG. 4 is used where the pulses are superimposed on a lower frequency wave to be recorded, the result will be a magnetization of the tape record medium such as represented in FIG. 5. A waveform such as shown in FIG. 3 can be generated by differentiating a square wave as by means of a circuit such as indicated at 41, 42 in FIG. 2.

By way of example and not of limitation, the circuit components of FIG. 2 may be implemented as follows:
capacitor 41 (500 picofarads);
resistor 42 (100 ohms);
resistors 51 and 52 (560 ohms each);
power field effect transistors 45 and 46 (type 2N3660);
capacitors 61 and 62 (0.1 microfarad);
resistors 58 and 59 (750 ohms each).
The capacitor bypassing secondary winding 74 has a value such that terminal 22a and circuit point 63 are essentially grounded with respect to the pulse signal of FIG. 3, for example. Output monitor 95 may comprise an audio transducer and/or a video display unit, or a data signal monitor, or the like.

A different kind of "imprinting" waveform as shown in FIG. 7 comprises a damped wave train of extremely high frequency and such a waveform may be obtained by shock exciting a resonant circuit. The resonant circuit may comprise the head inductance itself with inherent capacitance of its wiring or with added capacitance or inductance. The duty cycle here also is preferably quite low. A symmetrical (unmodulated) waveform as illustrated in FIG. 7 (preferably initiated alternately with positive going and negative going half cycles) is advantageous for erasing purposes. Offsetting the waveform, for example so that positive cycles have higher amplitude, or by superimposing a signal waveform by analogy with FIG. 4 will record a magnetization on the tape. The recording waveforms such as indicated in FIG. 7 may have only a single cycle, i.e. a half cycle positive and a half cycle negative during each recording interval. Such double pulses can be obtained from a differentiating circuit by exciting the input with pulses such as those in FIG. 3 instead of with the square wave. In other words, such a waveform would be the second derivative with respect to time of a square wave signal.

The recording waveform of FIG. 8 is advantageous in comparison to the waveform of FIG. 4 since it provides no net magnetic field in the core 10 during playback. The waveform of FIG. 8 may be generated by the circuit of FIG. 2 if the gate electrode of each of the transistors 45, 46 is negatively biased enough so that the signal to be recorded (e.g. FIG. 5) alone does not produce conduction, but so that the transducers become conductive when the pulses of FIG. 3 are superimposed (via transformer 44). The transistors 45, 46 are normally cut off during operation according to FIG. 4 without positive forward bias, and in addition, the diodes 48, 49 need about 0.7 volt positive bias before they conduct, so the diodes 48, 49 will give operation according to FIG. 8 even without negative bias supply when the amplitude of the signal to be recorded (e.g. FIG. 5) is kept low enough.

In general for erasing a record medium with a given saturation level, the peak amplitude of each pulse (e.g. for the waveform of FIG. 3) or the peak amplitude of the initial half cycle of each pulse in FIG. 7 would provide an erasing field reaching or exceeding such saturation level.

For recording bias, such peak amplitudes in FIGS. 3 and 7 should produce bias magnetic fields in the record medium magnetizable layer exceeding the coercivity of such magnetizable layer.

It will be apparent that many modifications and variations may be effected without departing from the scope of the novel concepts and teachings of the present invention.

SUPPLEMENTAL DISCUSSION

In a signal recording operation for FIGS. 1 and 2, without the signal correction feature, components 88, 91 and 92 may be omitted. A signal to be recorded may comprise an audio frequency signal representing music, speech or an analog instrumentation signal or the like having a maximum signal frequency component such as indicated in FIG. 5.

For the case of an alternating polarity pulse recording signal as shown in FIG. 8, a maximum signal frequency component such as indicated in FIG. 5 would produce a first sequence of alternating polarity pulses where the positive polarity pulses exceed the negative polarity pulses in amplitude in proportion to successive amplitude samples of the positive amplitude half cycle of the waveform of FIG. 5. In the region of the zero crossing at 5-1 in FIG. 5, successive pulses such as 8-1 and 8-2 would have substantially equal amplitude, after which the negative polarity pulses would exceed the positive polarity pulses in amplitude in proportion to successive amplitude samples of the negative amplitude half cycle of the waveform of FIG. 5. For example, the successive pulses at 8-3 (zero amplitude) and at 8-4 (maximum negative amplitude) would represent a sample at the negative peak region 5-2 of the waveform of FIG. 5.

As previously explained, the waveform of FIG. 8 may be produced by the circuit of FIG. 2, and thus FIG. 8 may represent the alternating polarity pulse waveform which is supplied to output terminals 21a, 22a, FIG. 2. The head 10 may have an effective frequency response extending to the third harmonic of the pulse repetition rate, and preferably to substantially higher odd harmonics than the third harmonic, such that the current flow through the gap spacer conductive path 14 is represented by a discontinuous pulse waveform with relatively short duration pulses of alternate polarity. Thus if generator 40, FIG. 2, operates at 250 kilohertz, the head 10 will have an effective frequency response extending at least to 750 kilohertz, and preferably substantially higher, e.g. including the seventh harmonic at 1.75 megahertz. The time interval between successive pulses of the actual current flow in the gap spacer conductive path 14 will substantially exceed the duration of the individual pulses of such actual current flow. As previously described the duty cycle of the driving waveform at the output terminals 21a, 22a, FIG. 2, may have a duty cycle of one percent or higher. Where the pulse repetition rate is 250 kilohertz, the maximum signal frequency component of FIG. 5 may have a frequency of twenty kilohertz, for example.

DESCRIPTION OF FIGS. 9, 10 AND 11

Figure 10:
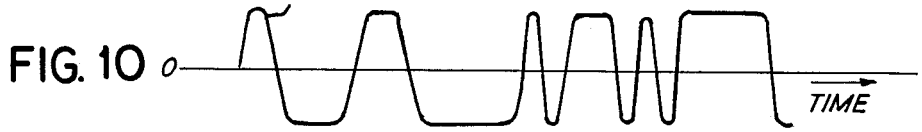
FIG. 10 shows the recorded magnetization resulting from applying the signal waveform of FIG. 9 to a conventional recording and playback system.

In digital recording, it is customary to record a NRZ (non-return to zero) signal as shown in FIG. 9. The signal at 9-1 in FIG. 9 may have a duration of two clock intervals and represent two binary digits, e.g. two binary zeros. Then the signal at 9-2 with a duration of four clock intervals would represent four binary ones, and so on. Where FIG. 9 represents the amplitude of current flow in a conventional recording head (between a positive maximum I+ and a negative maximum I−), FIG. 10 may represent the actual recorded magnetization on a channel of a tape record medium. The rounded edges as at 10-1 of the waveform are due to resolution limitations of the conventional record-playback system.

Figure 11:
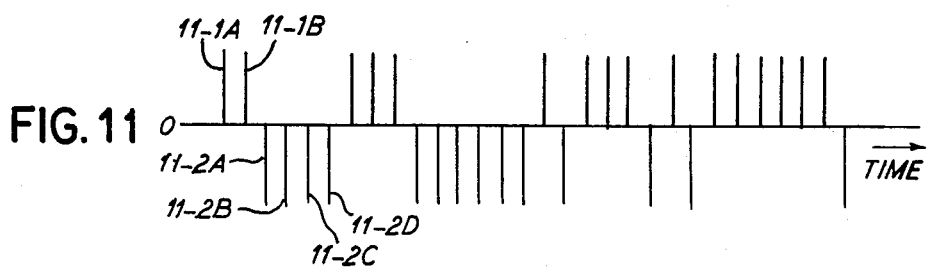
FIG. 11 shows a pulse waveform to be applied to a low inductance recording head in a recording system in accordance with the present invention.

FIG. 11 illustrates a pulse method of recording the signal of FIG. 9 according to the teachings of the present invention. In FIG. 11, the pulses 11-1A and 11-1B represent the information at 9-1 in FIG. 9, and the pulses 11-2A through 11-2D represent the information at 9-2 in FIG. 9, and so on. The pulses such as 11-1A and 11-1B, and 11-2A through 11-2D are each of extremely brief duration in comparison to a clock pulse interval of the signal of FIG. 9. The pulses of the waveform of FIG. 11 are of such short duration that the resistive power loss ($I^2R$) in the head is only a fraction of that which results from the waveform of FIG. 9. Thus the duty cycle of the pulses in FIG. 11 may be a small fraction such as one-tenth or less the clock pulse interval of the waveform of FIG. 9.

In the system of FIG. 11, the record medium moves appreciably between the occurrence of successive pulses such as 11-1A and 11-1B, and therefore more than one pulse is preferred to represent plural successive binary digits of the same value. Thus constant polarity portions of the waveform of FIG. 9 of greater than one clock cycle in duration would produce plural pulses of the waveform of FIG. 11.

For high repetition frequencies, efficient heads with close coupling of the winding conductor to the record medium magnetizable surface are recommended, (such as the heads shown in FIGS. 1, 2, 14 and 15 herein).

By way of example, a computer with a suitable high clock rate could be programmed to produce one pulse (or more) per bit of a word to be recorded and to change the polarity of the pulse each time the binary value changes. Using separate transformers to activate the transistors 45 and 46, FIG. 2, the pulses of one polarity could activate a primary winding coupled with a secondary winding corresponding to winding 44a in FIG. 2, while pulses of opposite polarity would activate a separate primary winding coupled with winding corresponding with the winding 44b in FIG. 2. For digital recording of this type, components 70, 71, 72, and 73 in FIG. 2 would be omitted, and components 40, 41, 42 and 44 would be replaced by the source of pulses for producing the waveform of FIG. 11 at terminals 21 and 22, FIG. 2.

For successful operation with alternating polarity recording and erasing waveforms as herein described, the head core must be of low loss construction capable of delivering a high magnetic field (exceeding the coercivity of the magnetic record medium in amplitude) at frequencies many times higher (e.g. at least three times higher) than the pulse repetition rate (i.e. the repetition rate of pulses of one polarity). A single conductor excitation path, avoiding multiple winding turns, gives a very low inductance of the order of fractions of microhenries (i.e. equal to or less than one microhenry and for extremely short pulses about one nanohenry or even less), and this enables enough current to flow through the single conductor path to properly record variable amplitude analog signals with substantially a linear transfer function, and to record pulse and frequency modulation analog signals and digital signals with an amplitude of recorded magnetization approaching the maximum available magnetization of the record medium; and to effectively erase higher coercivity record media (e.g. having a coercivity in the range from about 700 oersteds to 100 oersteds or more). The exemplary values for inductance and the specification of a head response to frequencies at least three times higher than the pulse repetition rate of the excitation pulse waveform, are applicable to the record and erase embodiments disclosed herein, which utilize the exciting waveforms of FIGS. 3, 4, 8 and 11, and/or which utilize head configurations such as shown in FIGS. 1, 2, 14 and 15.

An operable waveform of the type shown in FIGS. 3, 4, 8, 11, may have pulses with an active time duration of less than one fifth of the time period of the maximum signal frequency, and the quiescent time interval between successive pulses of opposite polarity may be at least twice the time duration of each pulse.

Certain audio frequency systems using relatively low frequency pulses, may have transducer heads with inductances up to about one hundred microhenries.

DESCRIPTION OF FIG. 12

Figure 12:
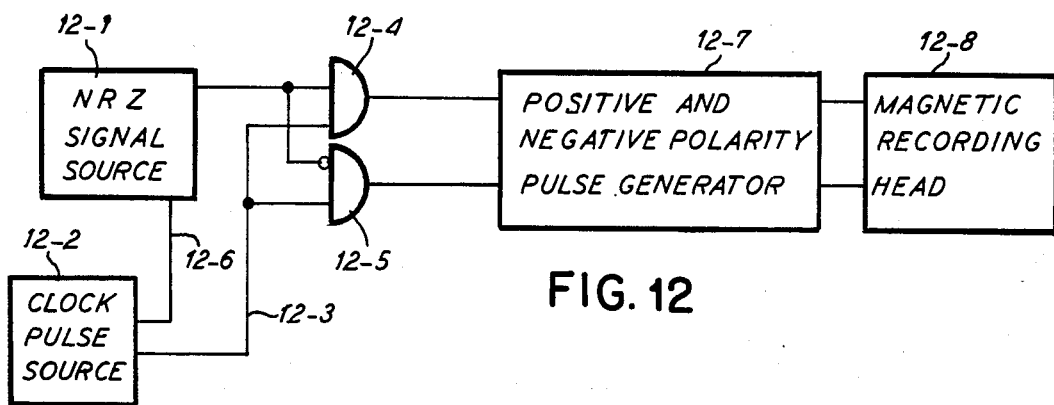
FIG. 12 is a block diagram of a recording system utilizing the pulse waveform of FIG. 11.

FIG. 12 illustrates a recording system wherein source 12-1 supplies a NRZ signal to be recorded such as that represented in FIG. 9. A clock pulse source 12-2 may supply clock pulses at 12-3 to gates 12-4 and 12-5 such that gate 12-4 transmits a positive clock pulse when the NRZ waveform is at its positive value, and gate 12-5 transmits a positive clock pulse when the NRZ waveform is at its negative value. In correspondence with the description of FIG. 11, the clock pulses at 12-3 may be occur at the clock pulse rate of the NRZ signal and be timed such that two clock pulses occur during the time of signal 9-1, FIG. 9, four clock pulses occur during the time of signal 9-2, and so on. Where a master sync signal occurs at twice the clock rate, one set of clock rate pulses at 12-6 may coincide with polarity transitions such as 9-3 and 9-4 in FIG. 9, while an alternate set of clock rate pulses may be supplied at 12-3, FIG. 12.

Positive and negative pulses as shown in FIG. 11 may be generated by generator 12-7 which may include two transformers in place of the single transformer of FIG. 2, with separate primary windings coupled with respective secondary windings such as 44a and 44b, FIG. 2. Components 40, 41, 42, 44 and 70, 71, 72 and 73 of FIG. 2 would not be required for such a generator 12-7. The magnetic recording head 12-8 may correspond with the head 10 of FIGS. 1 and 2 or with the head of FIG. 14 or FIG. 15. The pulses from the gate 12-4 would be supplied to a primary winding of polarity to activate transistor 45, FIG. 2, while pulses from the gate 12-5 would be supplied to an oppositely wound primary coupled so as to trigger transistor 46 via secondary winding 44b.

DESCRIPTION OF FIG. 13

Figure 13:
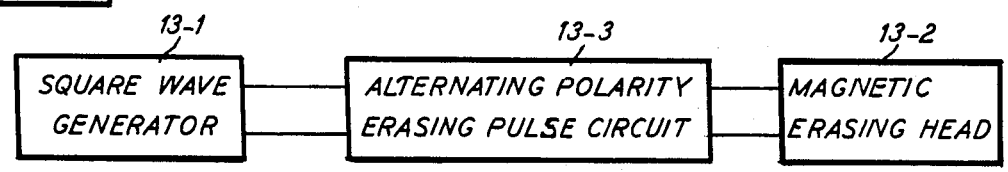
FIG. 13 shows an erasing system for utilizing pulse waveform excitation such as shown in FIG. 3 or FIG. 7.

FIG. 13 illustrates an erasing system for producing an alternating polarity erasing pulse waveform such as shown in FIG. 3 or FIG. 7. Generator 13-1 may correspond with square wave generator 40 in FIG. 2 and together with circuit 41, 42 may produce a pulse rate such that the pulse interval between successive pulses corresponds with movement of the record medium over a distance small in comparison with the effective longitudinal gap dimension of the erasing head 13-2. For example if the effective erase gap dimension is ten microns (one micron equals $10^{-6}$ meter), the record medium channel may move relative to the erase head a distance of about one micron or less in the interval between successive pulses.

The circuit 13-3 may be formed by the circuit of FIG. 2, with parts 70, 71, 72 and 73 omitted.

For high frequencies of the pulses of FIG. 3, the erasing head 13-2 should comprise an efficient head configuration with close coupling of the winding conductor to the magnetizable surface of the record medium. Such head configurations are shown in FIGS. 1, 2, 14 and 15.

DESCRIPTION OF FIGS. 14 AND 15

Figure 14:
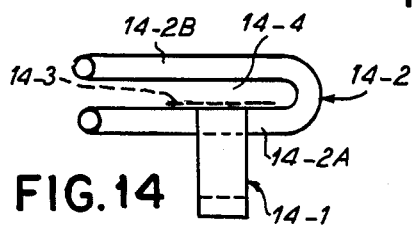
FIGS. 14 and 15 show low inductance heads for utilization with pulse excitation waveforms such as illustrated in FIGS. 3, 4, 8 and 11.
Figure 15:
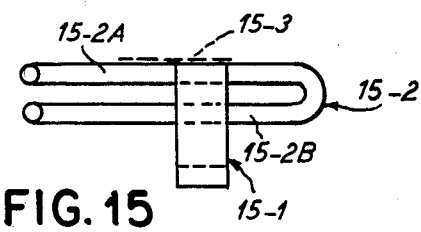

FIGS. 14 and 15 illustrate low inductance head configurations which can be used in producing effective pulse erase and record fields corresponding to head driving signals such as indicated in FIGS. 3, 4, 7, 8 and 11.

FIG. 14 shows a head configuration wherein a ring type magnetic core 14-1 has an electrically conductive winding 14-2 with a first conductor portion 14-2A extending through a gap in the magnetic core adjacent a record medium path 14-3. The configuration of the magnetic core 14-1 at the gap or coupling region is similar to that of the magnetic core 10 of FIGS. 1 and 2. The core 14-1 may comprise two C-shaped core parts which are in butting contact at their ends remote from the coupling gap, the ends of the core parts defining the coupling gap being located at opposite sides of the portion 14-2A of the winding 14-2. The conductor portions 14-2A and 14-2B of conductor 14-2 are arranged for minimum flux linkage with the magnetic core 14-1 and so as to enclose a minimum area at 14-4 between portions 14-2A and 14-2B.

FIG. 15 shows a ring type magnetic core 15-1 corresponding to core 14-1 and having a gap region receiving an electrically conductive winding 15-2 of "hairpin" configuration adjacent a record medium path 15-3. In this embodiment conductor portions 15-2A and 15-2B are both on the same side of the record medium path 15-3 as the magnetic core 15-1. The conductor portions 15-2A and 15-2B have a minimum spacing therebetween in the plane of the coupling gap for minimum flux linkage with the magnetic core.

By way of example, gap conductors 14, 14-2 and 15-2 may have thicknesses, corresponding to the gap dimension, in the range from one-tenth micron to about ten microns. Erase gaps generally range up to one hundred microns, for example.

DESCRIPTION OF FIGS. 16, 16A, 16D AND 17

In an embodiment according to FIGS. 16, 16A, 16D and 17, an analog signal to be recorded is supplied to a recording amplifier 16-1 via an input terminal 16-2 and produces an amplified signal at A1. A component 16-3 is utilized to sense the polarity of the analog signal at input 16-2 and, for example, at each pulse of a clock signal C to supply a positive pulse signal at output P1 when the analog signal is positive and to supply a negative pulse signal at output P2 when the analog signal is of instantaneous negative polarity. The component 16-3 may have an input high gain amplifier 16-4 which drives an amplitude comparator circuit 16-5. The sensitivity of the comparator circuit may be such that it senses the polarity of the analog signal with negligible error; for example in the case of speech or music signals, the component 16-3 will switch from transmitting positive pulses of a predetermined amplitude at output P1 to transmitting negative pulses of such predetermined amplitude at output P2 as the signal amplitude at input 16-2 goes from a positive amplitude value which is 0.1% of the maximum positive signal amplitude of the analog signal at input 16-2 to a corresponding negative amplitude value. Alternatively, the sensitivity can be sufficient to reverse the polarity of pulses from component 16-3 in a time corresponding to one clock pulse interval of clock signal C, when the analog signal reverses polarity. The input amplifier 16-4 of component 16-3 may be overloaded by the input analog signal so that its output is compressed or flat as a function of time over most of the analog signal duration, becoming sensitive near the time when the analog signal is reversing its polarity.

In one specific embodiment according to FIG. 16A and 17, the comparator 16-5 may be a window comparator and may control two analog switches of a sensitive pulse train generator 16-6, one controlling supply of positive pulses to output P1 and the other controlling supply of negative pulses to output P2. In the case of an audio input signal at 16-2, with a highest frequency component to be recorded of twenty kilohertz, the pulse repetition rate of each pulse train should be more than twice this frequency as for example 48 kilohertz or higher, and as a preferred example, may be 250 kilohertz. The positive and negative pulses may be rectangular pulses each with a pulse duration of about forty nanoseconds or less, and an interval between pulses of 4000 nanoseconds. The synchronizing clock pulse signal C may control the production of the positive and negative pulse trains of component 16-3 such that the respective positive and negative pulses at the inputs to the respective analog switches are time coincident. Alternatively the positive and negative pulse trains at the respective analog switch inputs may be 180 degrees out of phase, with each negative pulse occurring at half intervals midway between successive positive pulses at the input side of the analog switches; for this example the clock pulses C have an interval of 2000 nanoseconds.

At essentially zero signal input level at input 16-2, corresponding to a comparator input signal level algebraically greater than Vref-2 and less than Vref-1, both analog switches may be blocked so that mixer circuit 16-10, FIG. 16A, which superimposes the signal from recording amplifier 16-1 onto the output pulse train of component 16-3 will provide essentially a zero output level for a zero input signal at 16-2. Thus, transducer head 16-12 of FIG. 16D, which may be connected with output B1, FIG. 16A, may receive zero signal current and the corresponding portion of the magnetic record medium channel 16-13 remains in a demagnetized state. By way of example, the record medium channel 16-13 may move at constant speed in the direction of arrow 16-14 successively across longitudinally spaced poles of a ring type magnetic core forming part of the head 16-12.

In one specific embodiment of FIGS. 16, 16A, 16D and 17 previously referred to, component 16-3 supplies a series of positive pulses of constant amplitude and constant pulse interval during positive polarity portions of the input waveform, and these may be superimposed on the instantaneous value of the input analog signal by circuit 16-10, for example. Similarly during negative excursions of the input analog signal at input 16-2, the circuit 16-10 may superimpose constant amplitude constant rate pulses of negative polarity on the negative signal portions. The resultant waveform at B1 at the output of the circuit 16-10 is indicated in FIG. 17, where polarity transition regions such as 17-1 and 17-2 represent only the input signal without any superimposed pulses during transition time intervals each with a duration of at least two clock intervals of pulses of a given polarity, e.g. at least during a transition time interval of 8000 nanoseconds for the example previously given.

DESCRIPTION OF FIGS. 16, 16B, 18A, 18B AND 18C

In a second embodiment according to FIGS. 16, 16B, 18A, 18B and 18C, the selective pulse train generator 16-6 may have three active outputs P1, P2 and P0 for supplying positive pulses, negative pulses and alternating polarity pulses, respectively. In this case, the clock input signal C may generate an alternating polarity pulse train which is supplied to the input of a third analog switch of component 16-6, the output P0 receiving this alternating pulse train when the input analog signal at 16-2 has an amplitude within a transition region corresponding to the comparator amplitude range between Vref-1 and Vref-2. FIG. 18A shows a portion of the amplified analog waveform 18-A supplied by recording amplifier 16-1 (on a magnified scale) and shows at 18-1 and 18-2 signal amplitude levels corresponding to exemplary comparator reference inputs Vref-1 and Vref-2. When the amplified analog waveform 18-A has a negative amplitude algebraically less than the amplitude value at 18-2, component 16-3 supplies a negative pulse train at P2 to produce a resultant waveform at B2 in FIG. 16B as shown at 18-3 in FIG. 18C. When the amplitude of waveform 18-A is between the amplitudes at 18-1 and 18-2, the third analog switch becomes transmissive to supply the alternating polarity pulse train at P0, FIG. 16, and to produce a resultant waveform a indicated at 18-4 in FIG. 18C. Finally, when the amplitude of waveform 18-A exceeds the amplitude at 18-1, the positive pulse train is supplied at P1 to produce a resultant waveform as shown at 18-5 in FIG. 18C.

The clock signal C in FIG. 16 may actuate a bistable toggle circuit to generate a square wave signal. The square wave signal may be differentiated to produce alternate positive and negative pulses which are then shaped to the desired alternating polarity rectangular waveform and adjusted to desired equal positive and negative amplitude values. The positive pulse train for output P1 and the negative pulse train for output P2 may be derived from the alternating polarity pulse train by rectification to transmit only the positive polarity pulses to the input of the analog switch controlling output P1 and to transmit only the negative polarity pulses to the input of the analog switch controlling output P2.

In one implementation of component 16-3, FIG. 16, the amplitude comparator 16-5 may correspond with the window comparator circuit shown in FIG. 3.25 at page 116 of the text *Linear and Interface Circuit Applications* by the Engineering Staff of Texas Instruments Incorporated, 1974, by way of example but not of limitation. In this type of circuit, a first NAND gate (C) supplies a zero logic level (ground potential) when the input analog signal level (Vout) is equal to or greater than 2.4 volts (corresponding to Vref-1 in FIG. 16). In FIG. 3.25, the second reference level is 0.4 volts, but if this level is set at minus 2.4 volts, then a second NAND gate (D) will supply a zero logic level (ground potential) when the input signal level (Vout) is less than minus 2.4 volts. Further when the outputs of NAND gates (C and D) are both at a high logic level, the output of a third NAND gate (E) will be at a zero logic level signifying that the input analog signal level (Vout) is in the range between plus and minus 2.4 volts. In the one specific embodiment with operation as illustrated in FIGS. 16A and 17, the first and second NAND gates (C and D) would control respective analog switches and the output of the third NAND gate (E) would not be used. In operation according to FIGS. 16B and 18C, the outputs of the three NAND gates would control three respective analog switches. In each case the amplification of the input high gain amplifier 16-4 and/or the reference levels Vref-1 and Vref-2 would be adjustable to correspondingly select the amplitudes of the polarity transition switching points such as indicated at 18-1 and 18-2 in FIG. 18A.

In a simplified comparator circuit for component 16-3, a pair of matched NOR gate circuits which switch e.g. at 2.5 volts could receive respectively the output from the input high gain amplifier, and an inverted version thereof, so that one NOR gate would switch at plus 2.5 volts and the other NOR gate would switch with minus 2.5 volts supplied to the inverter input. The two NOR gates could control respective inputs of a NAND gate corresponding to the third NAND gate (E) previously mentioned so as to provide three selective logical zero outputs for controlling three analog switches as in the previously described implementation.

DESCRIPTION OF FIGS. 16, 16C, 19A, 19B AND 19C

FIG. 16 also illustrates a system for recording wherein an analog signal is supplied to input 16-2 but a component 16-21 which may be in series with amplifier 16-1 includes a signal sampler circuit operating at the clock rate of clock signal C so that the analog signal is converted to a sampled signal 19-A where successive pulses such as 19-1, FIG. 19A, accurately represent by their amplitude and polarity successive samples of the amplified analog waveform such as indicated at 19-2. Component 16-21 also includes an input low-pass filter to prevent aliasing by the sampler of signal components outside the band of interest.

The clock pulse signal C supplied to component 16-21, FIG. 16, may control the sampling rate of the analog waveform at input 16-2 and may operate at a pulse repetition rate more than two times higher than the highest frequency component of the analog waveform (corresponding to waveform 19-2) which is to be recorded. The sampler circuit of component 16-21 may control the amplitude of the pulses supplied by a pulse generator for example by modulating the amplitude of the pulses supplied by the pulse generator linearly in accordance with the amplitude and polarity of the instantaneous sample of an amplified analog waveform 19-2.

As indicated by FIGS. 19A and 19B, where component 16-21 supplies a signal pulse waveform 19-A during a polarity transition of the input analog waveform at input 16-2, and component 16-3 supplies a composite pulse train as shown in FIG. 19B with a positive polarity section 19-B1, an alternating polarity section 19-B0 and a negative polarity section 19-B2, the resultant signal to be recorded will have a waveform as shown in FIG. 19C. Thus, for a signal sample more negative than an amplitude level 19-3 set by threshold input Vref-2, e.g. for signal samples such as 19-1, the component 16-3 supplies negative pulses such as 19-6 to generate resultant head drive pulses such as 19.9. For signal samples at 19-10 and 19-11 in the illustration of FIG. 19A, the amplitude of the signal samples is below the threshold 19-3 selected by component 16-3, and the component 16-3 supplies an alternating polarity pulse group including a negative polarity pulse 19-12, and a positive polarity pulse 19-13 which are superimposed on signal values as indicated at 19-10 and 19-11; the resultant pulses are displaced by the amount of superimposed signal sample as indicated by the resultant pulses at 19-16 and 19-17. Where a signal sample in the transition region between levels 19-3 and 19-18 has negative polarity but coincides with a superimposed pulse of positive polarity, the net amplitude of a resultant pulse (e.g. at 19-19 at the time of superimposed positive pulse 19-20) may be positive but of a relatively low absolute value in comparison to the net negative pulse amplitude of a following resultant pulse such as 19-21 at the time of a negative pulse 19-22 from component 16-3. The pulse interval between pulses such as 19-19 and 19-21 is preferably such that the transducer system does not resolve these individual pulses. For example the magnetic record medium 16-13 may move at such a speed that the net magnetic field pulses due to resultant pulses 19-21 and 19-23 modify the magnetization produced by resultant pulse 19-19 to leave a net magnetization substantially linearly proportional to the signal value e.g. at 19-24 in the transition region.

In the next pulse sequence comprising positive polarity pulse 19-30 and negative polarity pulse 19-31 with a superimposed signal value as sampled at 19-32 and 19-33, the averaging effect on the magnetic record medium continues so as to leave a residual magnetization essentially linearly proportional to the signal value. Thus, for the pulse sequence 19-30 and 19-31, the signal value may be essentially zero, and the residual magnetization produced by the resultant pulses 19-23 and 19-35 is substantially zero.

Similarly for alternating polarity pulses following pulse 19-31, where a positive signal value is superimposed, a residual magnetization linearly proportional to the instantaneous signal value is produced on the record medium 16-13. A plot of the residual magnetization $B_R$ as a function of the successive signal magnetization values resulting from the signal samples in the transition region between levels 19-3 and 19-18 would substantially conform with the plot of signal waveform at 18-A or 19-2 during its transition from negative polarity of positive polarity.

The magnitudes of the negative polarity pedestal pulses e.g. as at 19-6 and of the positive polarity pedestal pulses at 19-45, etc., are preferably selected at a value such that the analog waveform is recorded with optimum fidelity; that is the plot of residual magnetization $B_R$ along the record medium channel would conform essentially identically to the sample values of FIG. 19A at the corresponding sampling intervals. As an alternative, component 16-3 can supply a signal I for blocking the output from component 16-21 during amplitude intervals of waveform 19-2 within the transition range between negative threshold level 19-3 and positive threshold level 19-18, so that only alternating polarity pulses as shown at 19-B0 are supplied via output B3, FIG. 16C, to the head 16-12.

Under some circumstances pedestal pulses from component 16-3 may be omitted e.g. by permanently blocking the output from the three analog switches of component 16-6. This could be the case, for example, where the recorded magnetization after each sampling interval is compared with the input signal, and corrected as needed during the next sampling interval to provide a linear recording in the high amplitude ranges below negative threshold 19-3 and above positive threshold 19-18. In this alternative the output at I could disable the sampler circuit of component 16-21 at low signal amplitudes corresponding to transition regions as selected by component 16-5 so that the analog signal represented by waveform 19-2 for example is supplied by circuit 16-1 to the head 16-12 during signal polarity transitions (rather than supplying sampled values of the analog continuous wave signal).

Where a pulse generator is omitted in component 16-21, a sampler circuit may provide a non-linear amplification of the pulse waveform 19-A such that the record medium 16-13 receives residual magnetization linearly proportional to each sample of the waveform to be recorded, the high magnitude sample pulses being recorded without any superimposed pedestal pulse from component 16-3, but the low magnitude sample pulses being superimposed on the alternating polarity pulse sequences from component 16-3 as in the previous examples.

In certain instances the sampler and pulse generator of component 16-21 may be operated at a submultiple of the repetition of the clock signal C. For example, if the highest frequency component of signal 19-2 to be recorded is twenty kilohertz, the sampling frequency of sampler circuit of component 16-21 may be one hundred kilohertz while the clock signal C may have a rate of 400 kilohertz or 500 kilohertz such that the time interval between successive pulses of alternate polarity is two microseconds or 2.5 microseconds, the longitudinal coupling gap of head 16-12 having a physical dimension of 0.0001 inch and the longitudinal scanning speed being 3.75 inches per second as in an example previously given. Thus during movement of the record medium a distance equal to the longitudinal gap dimension, there might occur 2.67 large signal amplitude sample pulses, but more than ten pulses of the alternating polarity pulse train during low signal amplitudes, e.g. four or five times as many pulses from component 16-3. The rapid alternate polarity pulse train thus sets the average value of residual magnetization at intervals when the signal amplitude is low, but is absent during high amplitude intervals where it is not necessary and would increase power dissipation and heating if present. In such an example, the resonant frequency of the head 16-12 might be at a frequency of six hundred kilohertz or higher. The head inductance would preferably be about one microhenry or less. Such very low inductance (and impedance) allows the brief duration pulses to fully magnetize the record medium efficiently with low power and low heating, allowing transducer heads and systems that would be impractical otherwise because of heat dissipation problems.

In one modification of FIG. 16C, analog switches may control the outputs A1 and A2 and may be controlled by the I signal suppled by component 16-5. With higher amplitude signal levels, the I signal may be at a logical one level and control the analog switches so that output A2 is supplied to a mixer component similar to that of FIG. 16C along with pulse train P1 or P2. When, however, the analog input signal at 16-2 is within a low amplitude range as defined by reference levels Vref-1 and Vref-2, then the analog switch at output A2 may be rendered nontransmissive by a logical zero signal level of the I signal, while the output A1 may have its analog switch in a transmissive state so that the analog signal is supplied to a fifth, A1 input of the mixer. Where the reference levels Vref-1 and Vref-2 are such that the I signal is at logical zero level only for signal amplitudes which are negligible, then the analog switch at output A1 may be permanently deenergized, so that all signal information is prevented from reaching the mixer when the I signal is at a logical zero level, and only pulse train P0 is active.

In another modification of FIG. 16C, the component 16-1 may include a signal sampler and a non-linear amplifier supplying a non-linearly amaplified signal to an output (A3, not shown). This non-linear amplifier predistorts the signal so that it is linearly recorded by the transducer system of FIG. 16D without the superposition of pedestal pulses P1 and P2. Where an I signal is at a logical zero for negligible amplitudes of the input signal at input 16-2, such I signal can control an analog switch at the signal output (A3) such that no signal information is transmitted while the P0 pulses are being applied to the transducer system of FIG. 16D.

With a signal waveform as shown in FIG. 18A or FIG. 19A, the reference levels Vref-1 and Vref-2 may be set at relatively high amplitude levels such that signal amplitudes outside the window range can be recorded without pedestal pulses P1 and P2. In these embodiments, the mixer receives the pulse train P0 when low signal amplitudes are present requiring superimposed alternating polarity pulses, but outputs P1 and P2 are not connected to the mixer. In one such embodiment, the inputs to the mixer are P0 and A1, while in the other embodiment the inputs to the mixer are P0 and A2. In a third embodiment an output (A3) from a non-linear amplifier may predistort higher amplitudes for linear recording of such higher amplitudes, while the alternating polarity pulse train P0 is superimposed on lower amplitude portions of the signal waveform.

I claim as my invention:

1. A transducer system comprising:
   a magnetic transducer head including a magnetic core having a coupling region at a record medium path for coupling of the transducer head with a channel of a magnetic record medium moving along said record medium path,
   record medium drive means for moving a magnetic record medium along said record medium path during recording of a signal on a channel of the record medium, and
   recording means comprising current conductor means coupling with said magnetic core for producing an effective recording field at said coupling region in accordance with a signal to be recorded, such that the signal is recorded along a channel of the record medium,
   said recording means supplying an alternating polarity pulse electric current to said current conductor means with each successive pulse having alternately opposite polarity and with the pulses having a constant amplitude and having substantially a given pulse repetition rate with respect to pulses of the same polarity, and having a discontinuous pulse waveform with relatively short duration pulses of alternate polarity and with substantially zero amplitude intervals of relatively long duration between each pair of the successive pulses of alternate polarity,
   said magnetic transducer head having an effective frequency response extending at least to the third harmonic of said pulse repetition rate but having a recording resolution so as to be incapable of recording effectively the fundamental frequency corresponding to said pulse repetition rate.

2. A magnetic recording system comprising:
   a magnetic head including a magnetic core having a coupling gap with a predetermined physical gap dimension in the direction of a magnetic record medium path extending across said coupling gap,
   record medium drive means for moving a magnetic record medium along said record medium path and across said coupling gap such that an erase signal supplied to said magnetic head will erase a signal recorded along a channel of the record medium, and
   erase means comprising electric supply means coupled with said magnetic core for supplying an erase signal producing an effective erasing field at said coupling gap,
   said erase means supplying an alternating polarity pulse electric current to said magnetic head with each successive pulse having alternately opposite polarity and with the pulses having a constant amplitude and having substantially a given pulse repetition rate between successive pulses of the same polarity, and having a discontinuous pulse waveform with relatively short duration pulses of alternate polarity and with substantially zero amplitude intervals of relatively long duration between each pair of the successive pulses of alternate polarity,
   said magnetic head having an effective frequency response extending at least to the third harmonic of said pulse repetition rate, but having a recording resolution so as to be incapable of effectively recording the fundamental frequency corresponding to said pulse repetition rate.

3. A magnetic recording system according to claim 2, with said magnetic head having an inductance as measured for said discontinuous pulse waveform of less than about one microhenry.

4. A transducer system operable with a given record medium scanning speed, and comprising:
   a magnetic core having a record medium coupling gap of an effective longitudinal dimension and having electrical conductor means coupled with said magnetic core for producing a magnetic field at the gap during a recording operation, and
   electric circuit means coupled with said electrical conductor means for supplying a pulse type electric current thereto having alternating polarity and having a pulse duration corresponding to a movement at the record medium scanning speed for a distance which is less than the effective longitudinal dimension of said nonmagnetic gap, and having a pulse repetition rate corresponding to a frequency which cannot effectively be recorded by said coupling gap.

5. A transducer system according to claim 4 with said pulse type electric current comprising successive pulses of alternately opposite polarity and of constant amplitude.

6. A transducer system according to claim 4 with said pulse type electric current comprising successive damped alternating polarity pulses.

7. A transducer system according to claim 6 with the successive pulses being initiated alternately with positive going and negative going half cycles.

8. A transducer system according to claim 4 with said pulse type electric current comprising unsymmetrical alternating polarity pulses.

9. A transducer system according to claim 8 with positive pulses progressively increasing in amplitude as the alternate negative pulse progressively decrease in amplitude, and with negative pulses progressively increasing in amplitude as the alternate positive pulses progressively decrease in amplitude.

10. A transducer system according to claim 4 with means comprising said pulse type electric current for effecting erasure of a record medium moving relative to said nonmagnetic gap at said record medium speed.

11. A transducer system according to claim 4 with said pulse duration of said pulse type electric current providing a duty cycle of not more than about one percent.

12. A magnetic transducer system for recording a signal having a given maximum signal frequency component, said transducer system comprising:
   a magnetic transducer head having a coupling region for coupling with a magnetic record medium of given coercivity during a recording operation, and having magnetic core means for defining a bias magnetic field in said coupling region,
   signal source means for supplying a signal having a given maximum signal frequency component to be recorded corresponding to a minimum time period,
   alternating polarity pulse bias source means operable during recording operation for generating a pulse bias waveform of alternating polarity with each pulse having an active time duration of less than one-fifth of said minimum time period, and having a quiescent time interval intervening between successive pulses of opposite polarity which is at least twice the time duration of each pulse, and
   said transducer head having bias conductor means coupled with the magnetic core means thereof for producing a bias magnetic field acting on the coupling region, said transducer head having an inductance as measured for the pulse bias waveform of not greater than one hundred microhenries enabling effective biasing of the record medium at said recording region with a bias field intensity exceeding the coercivity of said magnetic record medium, and said coupling region of said transducer head having a recording resolution so as to be incapable of recording effectively a frequency corresponding to the frequency of said pulse bias waveform.

13. A magnetic transducer system according to claim 12, with said bias conductor means having a resonant frequency substantially higher than a frequency corresponding to the interval between successive pulses of the same polarity of said pulse bias waveform.

14. A magnetic transducer system according to claim 13 with said transducer head being constructed such that oscillatory energy produced by each pulse of the pulse bias waveform has substantially decayed before a next succeeding pulse of opposite polarity of said pulse bias waveform excites said bias conductor means.

15. A magnetic transducer system for recording a signal having a given maximum signal frequency component, said transducer system comprising:
   a magnetic erasing head having a coupling region for coupling with a magnetic record medium of given coercivity during a recording operation, and having magnetic core means for defining an erasing magnetic field in said coupling region,
   a magnetic record medium having a recorded signal with a given maximum signal frequency component to be erased corresponding to a minimum time period,
   alternating polarity pulse erasing means operable during recording operating for generating a pulse erasing waveform of alternating polarity with each pulse having an active time duration of less than one-fifth of said minimum time period, and having a quiescent time interval intervening between successive pulses of opposite polarity which is at least twice the time duration of each pulse, and
   said erasing head having erasing conductor means coupled with the magnetic core means thereof for producing an erasing magnetic field acting on the magnetic record medium at said coupling region, said erasing head having an inductance as measured for the pulse erasing waveform not greater than one hundred microhenries enabling effective erasing of the record medium at said coupling region with an erasing field intensity exceeding the coercivity of said magnetic record medium, and said pulse erasing waveform providing an erasing field of a frequency which cannot be recorded by said coupling region.

16. A transducer system according to claim 15 with the record medium moving through the coupling region at a constant speed such that successive erasing pulses act on the record medium at intervals greater than the recorded wavelength of said maximum frequency component, said erasing head having a resonant frequency corresponding to a recorded wavelength substantially less than the recorded wavelength of said maximum frequency component.

17. A transducer system comprising:
   magnetic transducer head means including magnetic core means with a longitudinal coupling gap of given physical dimension for coupling of the magnetic core means with a magnetic record medium channel relatively moving in a longitudinal direction across the longitudinal coupling gap at a predetermined relative scanning speed such that a given maximum audio frequency component can be recorded on the magnetic record medium channel during a recording operation,
   said magnetic core means having transversely extending electrical conductor means extending transversely to said magnetic core means at said longitudinal coupling gap for coupling with a portion of the magnetic record medium channel instantaneously at said longitudinal coupling gap during a recording operation, and
   recording means connected with said electrical conductor means for producing a series of magnetic field pulses at said longitudinal coupling gap of intensity varying in accordance with an audio signal to be recorded and of repetition rate such that a plurality of magnetic field pulses occur during relative movement of the magnetic record medium channel equal to the physical dimension of said longitudinal coupling gap, the relative scanning speed being such that a frequency corresponding to the repetition rate of said magnetic field pulses cannot be recorded by said coupling gap.

18. A transducer system according to claim 17, with said magnetic core means having a longitudinal coupling gap with a physical dimension of about one ten thousandth of an inch and said recording means producing a series of magnetic field pulses with a time interval therebetween of about two thousand nanoseconds.

19. A transducer system according to claim 17, with said recording means during zero amplitude of an audio signal producing a series of magnetic field pulses of alternating polarity and of substantially equal peak amplitude which are not recorded on the magnetic record medium channel.

20. A transducer system according to claim 17, with said recording means producing at least about thirteen magnetic field pulses during relative movement of the magnetic record medium channel a distance equal to the physical dimension of the longitudinal coupling gap.

21. The method of recording audio signal information including audio frequency components of frequency less than an upper audio frequency limit by means of a magnetic transducer head having a longitudinal resolution limit for a given magnetic record medium scanning rate such that frequencies above the upper audio frequency limit cannot be recorded, said method comprising:

generating an alternating polarity audio frequency signal containing audio frequency components with frequencies less than the upper audio frequency limit and supplying said alternating polarity audio frequency signal to said magnetic transducer head while the magnetic transducer head is in coupling relation to the magnetic record medium and is being displaced in a longitudinal direction of the transducer head relative to the record medium at the given magnetic record medium scanning rate, and superimposing on the alternating polarity audio frequency signal successive pedestal pulses having a selected amplitude exceeding the coercivity of the magnetic record medium and having a repetition rate at least twice said upper audio frequency limit and at least twice the maximum frequency which can be recorded by said magnetic transducer head.

* * * * *